United States Patent
Vanderhelst

[15] 3,654,424
[45] Apr. 4, 1972

[54] QUOTIENT CIRCUIT

[72] Inventor: Peter W. Vanderhelst, Livonia, Mich.
[73] Assignee: Robotron Corporation, Detroit, Mich.
[22] Filed: Mar. 23, 1970
[21] Appl. No.: 24,928

[62] Division of Ser. No. 650,714, July 3, 1967, Pat. No. 3,573,421

[52] U.S. Cl................................219/110, 307/229, 324/140, 328/161
[51] Int. Cl................................................B23k 11/24
[58] Field of Search.........................................219/108–114; 307/235, 229; 328/161; 324/140 D; 235/196

[56] References Cited

UNITED STATES PATENTS

| | | | |
|---|---|---|---|
| 3,162,759 | 12/1964 | Robinson | 235/196 |
| 2,419,852 | 4/1947 | Owen | 324/140 D |
| 2,740,044 | 3/1956 | Storm | 328/161 |
| 3,344,263 | 9/1967 | Gere et al. | 235/196 |

FOREIGN PATENTS OR APPLICATIONS

| | | |
|---|---|---|
| 932,704 | 7/1963 | Great Britain |

Primary Examiner—J. V. Truhe
Assistant Examiner—J. G. Smith
Attorney—Woodhams, Blanchard and Flynn

[57] ABSTRACT

A resistance drop feedback welding control circuit is disclosed which includes apparatus for detecting the effective instantaneous resistance across the welding position of a resistance welding machine from the electrode voltage and welding current. A method of detecting the effective instantaneous resistance from the electrode voltage and welding current is also disclosed. Means are provided for producing pulses in concurrence with peaks of the welding current waveform. Further means controlled by these pulses sample the electrode voltage and welding current at the welding current peaks. A quotient circuit produces a high frequency pulse train in which the pulse amplitude is proportional to the peak electrode voltage amplitude and the pulse duration is inversely proportional to the peak amplitude of the welding current. The quotient circuit includes means for averaging the amplitude of the high frequency pulse train to provide a d.c. output portional in magnitude to the contact resistance at the welding position.

11 Claims, 28 Drawing Figures

PEAK I PULSE CIRCUIT

INVENTOR.
PETER W. VANDERHELST
BY
Woodhams, Blanchard & Flynn
ATTORNEYS

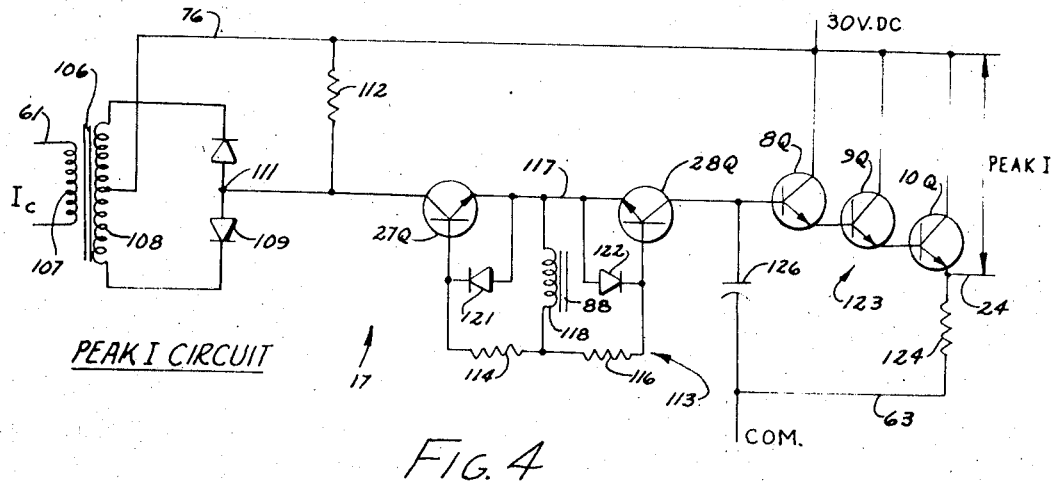
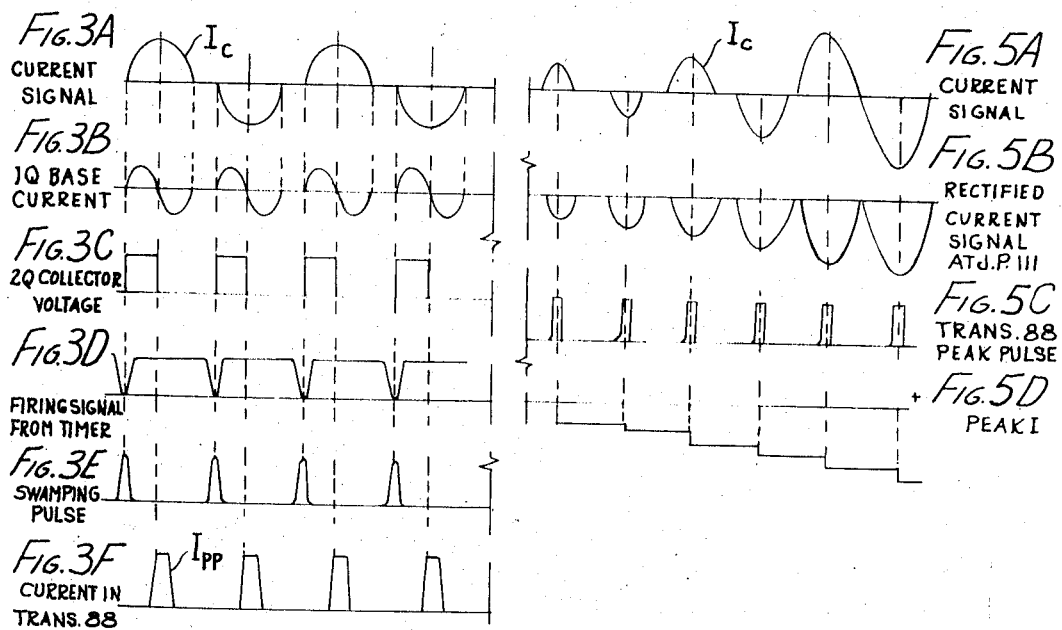

PATENTED APR 4 1972
3,654,424
SHEET 3 OF 4
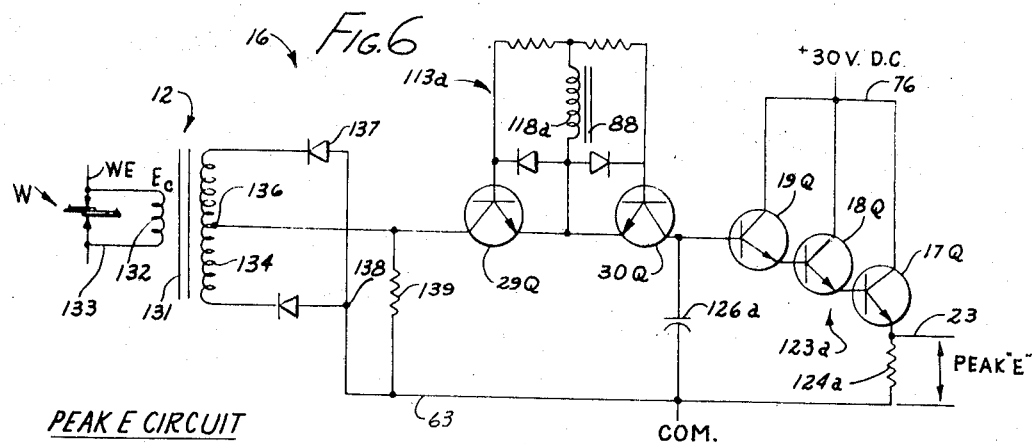
FIG. 6
PEAK E CIRCUIT
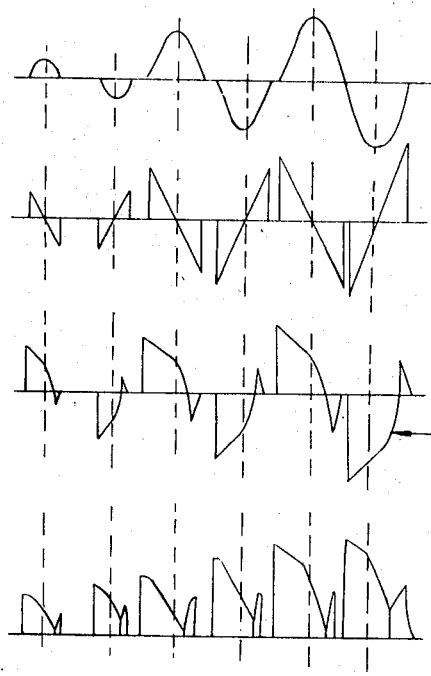
FIG. 7A
ELECTRODE VOLTAGE
(IN PHASE WITH CURRENT)
FIG. 7B
$di/dt$ PICKED UP BY
ELECTRODE WIRES
FIG. 7C
SIGNAL $E_c$
ELECTRODE VOLTAGE PLUS $\frac{di}{dt}$
TRUE VALUE OF ELECTRODE
VOLTAGE OCCURS AT CURRENT
PEAK WHERE $\frac{di}{dt}$ IS ZERO
FIG. 7D
RECTIFIED SIGNAL AT
INPUT TO GATE 113a
FIG. 7E
TRANS. 88
PEAK PULSE
FIG. 7F
PEAK "E"
INVENTOR.
PETER W. VANDERHELST
BY
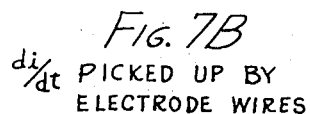
ATTORNEYS

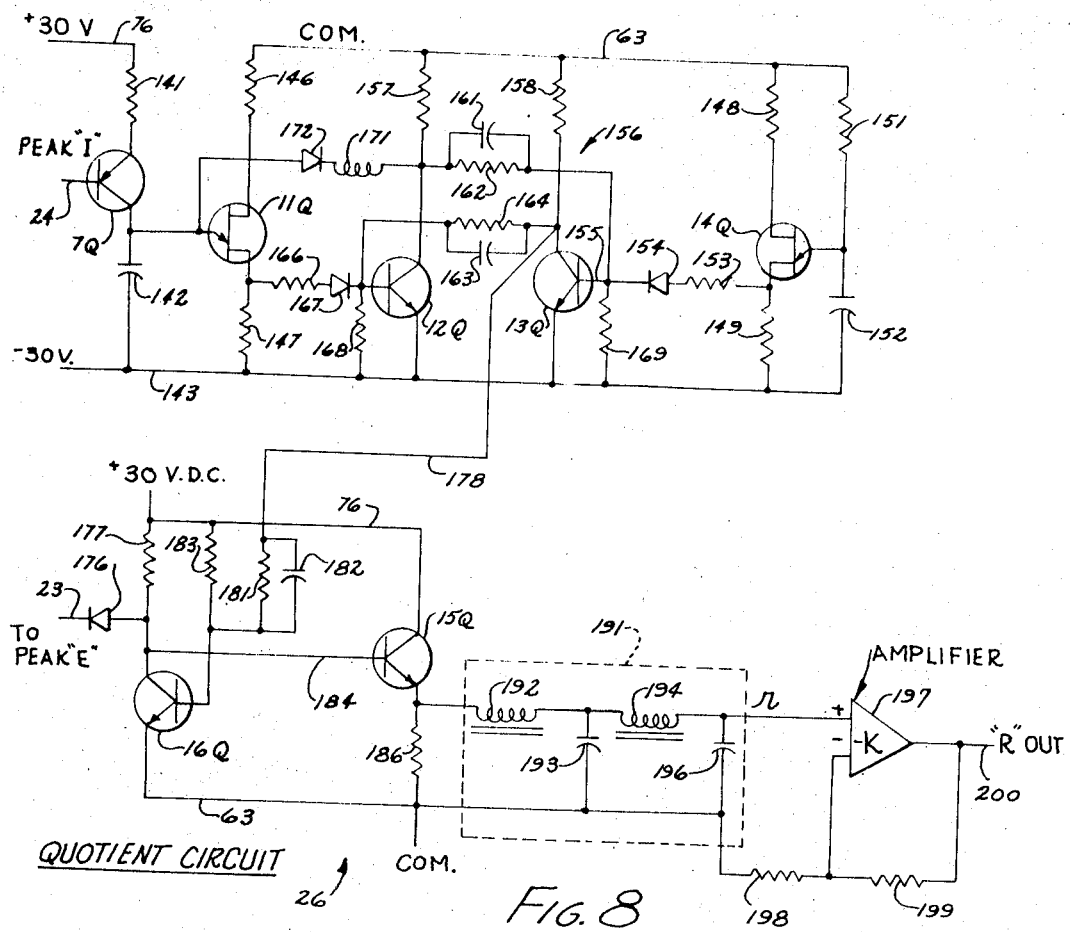

QUOTIENT CIRCUIT

This application is a division of my copending application Ser. No. 650,714, filed July 3, 1967.

CROSS REFERENCES TO RELATED APPLICATION

1. Application Ser. No. 650,789
2. Application Ser. No. 650,964

FIELD OF THE INVENTION

This invention relates to a resistance drop feedback welding control and more particularly relates to a method and apparatus for detecting the effective instantaneous resistance across the welding position from electrode voltage and welding current sensed thereat.

DESCRIPTION OF THE PRIOR ART

It has been known for some time that, in the welding of plain uncoated mild steel, there is a discernible change in the electrical resistance of the workpiece as the weld is made. For the first cycle or two of weld time, the resistance is unstable as it is affected by the condition of the material surfaces. After three cycles or so, the surface conditions usually become stable and the resistance normally rises somewhat as the temperature of the workpiece rises. At the beginning of fusion the resistance levels off and begins to drop. It is this resistance drop that is indicative that a weld is being made. There is evidence that the amount of drop is related to nugget size.

Several controls are known which do nothing more than watch resistance under constant current conditions and terminate weld time when the desired resistance drop has occurred. Although not too difficult to do, this has the disadvantage of requiring and causing widely varying weld times. This is usually not acceptable on a gun welding job or even on a high speed press operation.

An improvement on this was disclosed by U.S. Pat. No. 2,848,595 to Van Sciver now assigned to the assignee of the present invention. In that system, the contact resistance at the weld position is constrained to follow a predetermined function during weld nugget formation. This function is experimentally determined prior to welding and is programmed into the welding machine. The Van Sciver machine generates a function signal related to the above-mentioned predetermined function, compares the function signal to a signal related to the contact resistance detects, determines the error between them and then varies the heat input to the workpiece to correct such error.

However, the Van Sciver device has a number of operational disadvantages which it is the purpose of the present application and of copending application Ser. Nos. 650,789 and 650,964 to cure.

The Van Sciver device is sharply limited in its use due to the types of components and circuitry used therein. It has been found that a device built according to the Van Sciver patent required the services of an engineer with an oscilloscope to set it up and it was necessary to repeat the setup every day due to tube drift and various other instabilities in the circuitry.

Accordingly, it is an object of this invention to provide a feedback resistance drop welding control including an improved method and apparatus for detecting the instantaneous contact resistance at the welding position.

A further object is to provide a method and apparatus, as aforesaid, particularly adapted and intended for use with circuitry for comparing said instantaneous resistance to a preselected resistance function capable of causing the instantaneous contact resistance to reach a preset value at a preset time and for use with further circuitry capable of causing the heat applied to the welding position to vary in a manner to reduce its deviation from the preselected function.

A further object is to provide a method and apparatus, as aforesaid, in which the value of the instantaneous contact resistance is obtained by taking the quotient of the instantaneous peak electrode voltage at the welding position and the instantaneous peak welding current appearing at the welding position. A further object is to provide a method and apparatus, as aforesaid, in which the time of occurrence of the peak in the welding current waveform is noted and in which the values of the welding electrode voltage and welding current used to determine the instantaneous weld contact resistance are sensed at the peak of the current waveform.

A further object is to provide a method and apparatus, as aforesaid, in which error in the value of the electrode voltage due to induction effects is eliminated by detecting electrode voltage at the peak of the welding current waveform.

A further object is to provide a method and apparatus, as aforesaid, in which the instantaneous value of the electrode voltage and of the welding current at the peak of the welding current waveform are stored between current peaks and in which the instantaneous contact resistance is determined from these stored values.

A further object of this invention is to provide a method and apparatus, as aforesaid, in which signals which are a function of the electrode voltage and the welding current amplitudes are caused to independently control two independent parameters of a pulse waveform which waveform is a function of the contact resistance.

A further object is to provide a method and apparatus, as aforesaid, in which a train of pulses is produced in a manner that the amplitude of each pulse is a function of the instantaneous value of the electrode voltage sensed, the duration of each pulse is a function of the instantaneous value of the peak current sensed and the average amplitude value of the pulse waveform is a function of the contact resistance.

It is a further object of this invention to provide an apparatus, as aforesaid, which is highly stable in operation, which is insensitive to changes in its operating environment, which will operate for long periods without adjustment, which can be readily and inexpensively manufactured from standard components, which can be compactly packaged, which is adaptable to use with a wide variety of welding machines and which is capable of a long and trouble-free service life with little or no maintenance.

Other objects and purposes of this invention will be apparent to persons acquainted with the apparatus of this general type upon reading the following description and inspecting the accompanying drawings.

BRIEF DESCRIPTION OF THE DRAWINGS

FIGS. 3A–3F are waveform diagrams related to signals appearing at various points in the peak pulse circuit of FIG. 2.

FIG. 4 is a schematic diagram of the peak I circuit of FIG. 1.

FIGS. 5A–5D are waveform diagrams illustrating signals appearing at various points in the peak I circuit of FIG. 4.

FIG. 6 is a schematic diagram of the peak E circuit of FIG. 1.

FIGS. 7A–7F are waveform diagrams illustrating signals appearing at various points in the peak E circuit of FIG. 6.

FIG. 8 is a schematic diagram of the quotient circuit of FIG. 1.

FIGS. 9A–9G are waveform diagrams illustrating signals appearing in the quotient circuit of FIG. 8.

Figure 1:
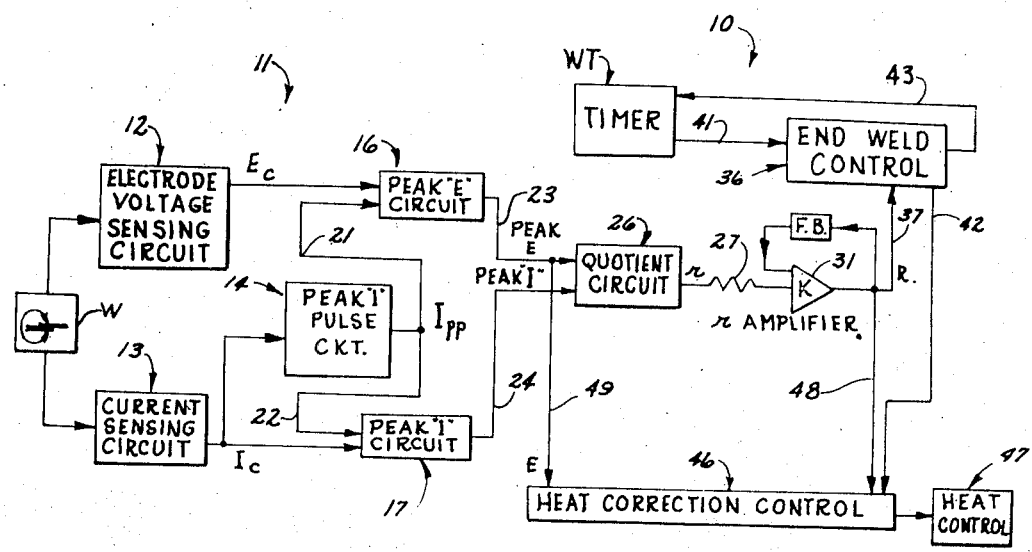
FIG. 1 is a block diagram of a feedback heat correction circuit embodying the present invention.

Certain terminology will be used in the following description for convenience in reference only and will not be limiting. The words "upwardly," "downwardly," "rightwardly" and "leftwardly" will refer to directions in the drawings referred to. Such terminology will include the words above specifically mentioned, derivatives thereof and words of similar import.

SUMMARY OF THE INVENTION

In general, the objects and purposes of this invention are met by providing a resistance drop feedback welding heat control circuit which compares the instantaneous value of the contact resistance at the welding position with a preselected resistance function and controls welding heat to minimize the difference between the instantaneous contact resistance and the instantaneous value of said resistance function. For providing the instantaneous value of the contact resistance, the welding current waveform and the electrode voltage waveform at the welding position are sensed. Means, fed by the welding current waveform, produce a pulse train, in which pulses occur at the peaks of the welding current waveform. In addition, circuitry is provided for reading the instantaneous amplitude of the electrode voltage waveform and the welding current waveform coincidentally with the occurrence of pulses in the pulse train. The values read are stored and supplied to quotient circuitry. The quotient circuitry includes means for generating a second pulse train and means for controlling the amplitude and duration of each pulse of the second train as a function of respective ones of the stored electrode voltage and welding current amplitude values. The instantaneous value of the contact resistance is formed by averaging the amplitude of pulses of the second train.

DETAILED DESCRIPTION

Turning now to the drawings, FIG. 1 discloses in block diagram form the feedback resistance drop welding control 10 embodying the invention and which causes the contact resistance at the weld position during welding to follow a preselected desired resistance function. The resistance drop feedback control 10 includes a portion 11 for providing a signal proportional to the instantaneous contact resistance hereinafter referred to as the contact resistance generator 11. The contact resistance generator 11 includes an electrode voltage sensing circuit 12 and a current sensing circuit 13 which are connected to the welding circuit W to sense the electrode voltage and welding current, respectively, and to provide continuous voltage signals $E_c$ and $I_c$ of waveform corresponding to the electrode voltage and welding current, respectively. The output $I_c$ of the current sensing circuit 13 is fed to a peak I pulse circuit 14 which generates a train of narrow pulses synchronized with and appearing at the half wave amplitude peaks of the welding current. The outputs $E_c$ and $I_c$ of the electrode voltage sensing circuit 12 and the current sensing circuit 13 are fed respectively to a peak E circuit 16 and a peak I circuit 17. The pulse train output of the peak I pulse circuit 14 is applied through lines 21 and 22 to the peak E circuit 16 and peak I circuit 17 to cause same to detect the instantaneous values of the electrode voltage signal $E_c$ and welding current signal $I_c$ from the circuits 12 and 13, respectively, in synchronism with the amplitude peaks of the welding current waveform. The detected values E and I of the electrode voltage and welding current signals $E_c$ and $I_c$, respectively, are applied through lines 23 and 24, respectively, to the input of a quotient circuit 26. The quotient circuit 26 determines the quotient peak E/peak I = r. The signal r is impressed, through a resistance 27, on the input of an operational amplifier 31. The output signal R of the operational amplifier 31 is thus an analog representation of the instantaneous contact resistance at the welding position taken at successive peaks of the weld current.

The feedback control circuit 10 further includes an end weld control circuit 36 preferably of the type disclosed in copending application Ser. No. 650,789. The output R of the amplifier 31 is applied to the end weld control 36 through a line 37. In addition, the end weld control 36 receives a signal from the welding timer WT, which timer may be of any convenient type, for example, one of the type shown in copending application Ser. No. 369,727 assigned to the assignee of the present invention. Thus, the timer WT impresses on the end weld control 36, through a line 41, a signal which indicates the beginning of weld current flow through the weld position W during each half cycle of weld time. Customarily, the contact resistance will build up from a relatively low value at the beginning of the welding interval to a maximum value as the weld nugget forms and then will drop off at a substantially, though not necessarily precisely, linear rate until the weld is completed. The end weld control 36 prevents the control 10 from operating during the first few cycles (termed the transition period) of the weld time during which time the contact resistance is unstable due to material surface conditions. The end weld control 36 has an output signal which is applied to an output line 42 at the end of the transition time. A further function of the end weld control is to detect the highest value $R_p$ of the contact resistance signal R reached after transition time with succeeding instantaneous values of R. The end weld control is arranged to impress an end weld signal on a further output line 43 which leads back to the timer WT when a predetermined ratio of the instantaneous value R and peak value $R_p$ is reached. In the event that such a ratio is not achieved within a preselected time the timer WT further actuates the end weld control 36 to indicate the end of the weld interval and the end weld control is then adapted to actuate an alarm of any convenient type to signal that a questionable weld has taken place.

The control 10 further includes a heat correction control circuit 46 preferably as shown in my copending application Ser. No. 650,964. The heat correction control 46 in turn actuates and controls a conventional heat control circuit 47 for varying the heat input to the welding zone in a manner to minimize the difference between the value of the instantaneous contact resistance R and a desired resistance function generated therewithin. To this end, the transition signal line 42 from the end weld control 36 connects to the heat control 46 to initiate its operation. Further, the output of the amplifier 31 is taken through a line 48 to impress the contact resistance signal R on the heat correction control.

The peak E signal fed to the quotient circuit 26 may be fed by a line 49 to the heat correction control circuit 46 when it is desired to regulate welding heat with reference to the electrode voltage rather than the contact resistance.

Figure 2:
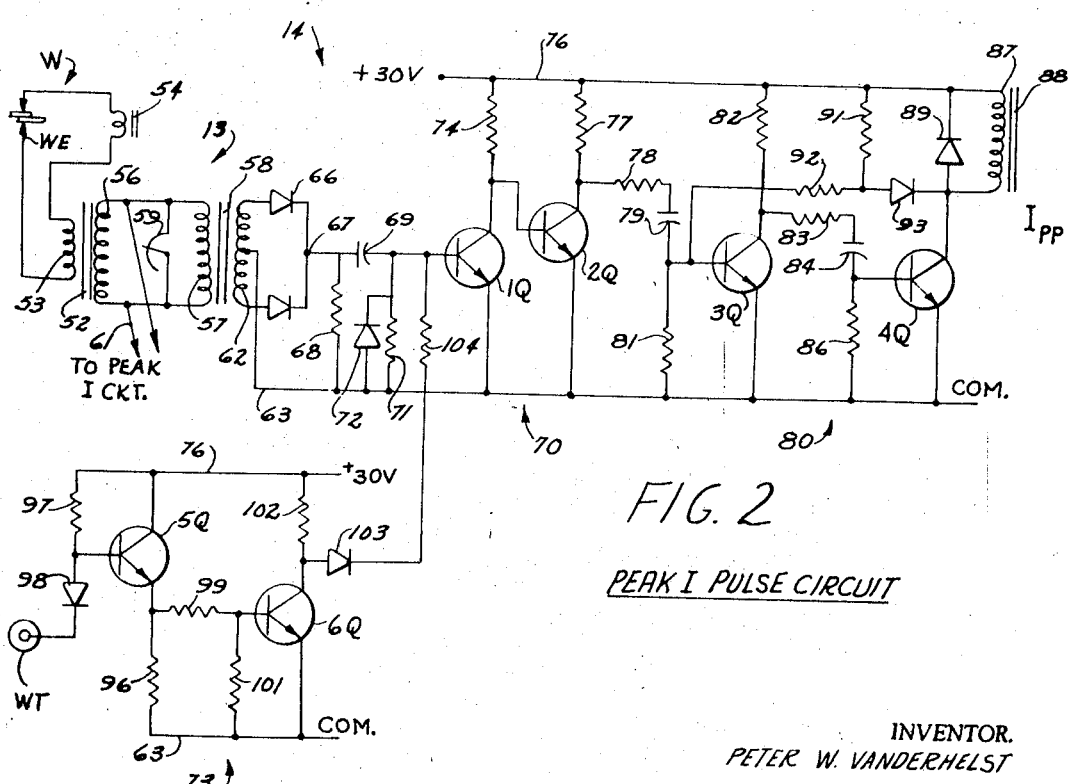
FIG. 2 is a schematic diagram illustrating the peak pulse circuit of FIG. 1.

Turning now more particularly to the contact resistance generator portion of the feedback control 10, FIG. 2 discloses the preferred embodiments of the peak I pulse circuit 14 of FIG. 1, and of the current sensing circuit 13. The current sensing circuit 13 includes a current transformer 52 having a primary winding 53 connected in series with the primary or secondary of the welding transformer 54 and the welding electrodes E of the welding position W for energization by welding current flowing therethrough. The secondary winding 56 of the current transformer 52 connects across the primary 57 of a further transformer 58. A rheostat 59 shunts the secondary 56 of the current transformer to adjust the magnitude of the current signal $I_c$ impressed on the primary winding 57 of the input transformer 58 of the peak I pulse circuit 14 so that the input signal will fall within the range of the circuit 14. Lines 61 connect the ends of the secondary 56 of the current transformer 52 to the input of the peak I circuit of FIG. 4 as hereinafter discussed.

The secondary winding 62 of transformer 58 is center tapped. The center tap thereof connects to a common potential line 63 while each of the ends of the secondary 62 connects through a diode 66 to a junction point 67, the cathodes of diodes 66 both facing the junction point. A load resistor 68 connects between the junction point 67 and the common line 63. Thus, the current signal $I_c$ applied to the primary winding 57 of the transformer 58 is transformed to the proper voltage level and full wave rectified by diodes 66. The rectified signal is applied across the load resistor 68.

The peak I pulse circuit 14 includes a trigger circuit 70 comprising transistors 1Q and 2Q. Junction point 67 is coupled by a capacitor 69 to the base of transistor 1Q. Base bias is supplied to transistor 1Q by a resistor 71 from the common line 63. A diode 72 clamps the vase of transistor 1Q at or above the potential on common line 63.

A swamping circuit 73, hereinafter described, provides a swamping pulse to the base of transistor 1Q as the ignitrons driving the weld transformer 54 turn on during each half cycle of the weld interval to swamp out any noise which might reach transistor 1Q and insure correct firing thereof.

The emitter of transistor 1Q connects directly to the common line 63 and its collector connects through a dropping resistance 74 to a positive potential line 76 held by any convenient power supply, not shown, at a specified positive voltage, here for example 30 volts. A further transistor 2Q is connected at its emitter to the common line 63, at its collector through a dropping resistance 77 to the positive potential line 76 and at its base to the collector of transistor 1Q.

The peak pulse circuit 14 further includes a one shot multivibrator circuit 80 comprising transistors 3Q and 4Q. A series resistance 78 and capacitance 79 extends from the collector of transistor 2Q and provides a signal to the base of transistor 3Q. Base bias is provided to the transistor 3Q from the common line 63 through a resistor 81. The emitter of transistor 3Q connects directly to the common line 63 and through a dropping resistor 82 to the positive potential line 76. Output is taken from the collector of transistor 3Q through a series resistance 83 and capacitor 84 to the base of transistor 4Q. Base bias is applied to transistor 4Q through a resistance 86 from the common line 63. The emitter of transistor 4Q connects directly to the common line 63 and the collector thereof connects through the primary winding 87 of an output transformer 88 to the positive potential line 76. The primary winding 87 is shunted by a diode 89, the anode of which connects to the collector of transistor 4Q. Resistances 91 and 92 connect from the positive potential line 76 to the base of transistor 3Q and cooperate with resistor 81 in biasing same. In addition, feedback is applied from the collector of the transistor 4Q to the base of transistor 3Q through a diode 93 in series with the resistance 92, the anode of diode 93 facing the resistance 92. The output $I_{pp}$ of the circuit 14 is a pulse train which is applied to output transformer 88, the pulses starting at successive peak points of the weld current half cycles.

Considering the swamping circuit 73 in more detail, same includes transistors 5Q and 6Q. The transistor 5Q is an emitter follower, its collector being connected to the positive potential line 76 and its emitter being connected through a dropping resistor 96 to the common line 63. Base bias is supplied through a resistor 97 from the positive potential line 76.

The weld timer WT controls the flow of weld current through the electrodes. The weld timer WT supplies a signal when the ignitrons, not shown, energizing the weld transformer 54 begin conduction in each half cycle of weld current. The signal in the particular embodiment shown is a negative pulse (FIG. 3D) which is applied through a diode 98 to the base of transistor 5Q to reduce its conduction. Output is taken from the emitter of transistor 5Q and is fed through a resistor 99 to the base of amplifier transistor 6Q. Base bias is applied to transistor 6Q through a resistance 101 connected to the common line 63. The emitter of transistor 6Q connects directly to common line 63 and its collector is connected through a resistor 102 to the positive potential line 76. A positive pulse appears on the collector of transistor 6Q when conduction through the ignitrons is desired to begin and the system is relatively "noisy," and is applied through a series diode 103 and resistor 104 to the base of transistor 1Q as aforementioned.

The peak I circuit 17 (FIG. 4) includes a transformer 106. The current signal $I_c$ is applied to the primary winding 107 of a transformer 106 by the lines 61 (FIG. 2) from the current sensing circuit 13. The transformer ratio is selected to provide the proper signal magnitude for the rest of the peak I circuit 17. The secondary winding 108 of the transformer 106 is center tapped, the center tap thereof being connected to the positive potential line 76. The ends of the secondary winding 108 connect through similar oriented diodes 109 to a junction point 111, the anodes of the diodes 109 facing the junction point 111. The full wave rectified current signal is of negative polarity with respect to the positive potential line 76 and appears across the dropping resistance 112 connecting the junction point 111 to the positive potential line 76.

A pair of transistors 27Q and 28Q form a series gate circuit 113. The series gate circuit 113 includes a voltage divider comprising series resistors 114 and 116 connecting the bases of transistors 27Q and 28Q. The emitters of transistors 27Q and 28Q are directly connected by a conductor 117. The secondary winding 118 of the peak I pulse transformer 88 (FIG. 2) connects from the center of the voltage divider 114, 116 to the emitter line 117 for applying the peak I pulse signal $I_{pp}$ to the bases of transistors 27Q and 28Q.

The cathodes of shunting diodes 121 and 122 are connected to the bases of transistors 27Q and 28Q, respectively, and the anodes thereof are connected to the emitter line 117 for shorting reverse base-emitter voltages to protect said transistors. The input end of the gate 113 comprises the collector of transistor 27Q which is connected to the junction point 111 above mentioned. The output end of the gate 113 comprises the collector of transistor 28Q which is connected to the input of a buffer circuit generally indicated 123, here a triple emitter follower. Each peak I pulse on the secondary 118 of the peak I transformer 88 causes the transistors 27Q and 28Q to conduct and thereby opens the gate 113 for the duration of the peak I pulse. The signal on junction point 111 is applied by the open gate 113 to the base of the first transistor 8Q of the buffer 123.

The buffer 123 also includes further transistors 9Q and 10Q. The collectors of transistors 8Q, 9Q and 10Q directly connect to the positive potential line 76. The emitters of transistors 8Q and 9Q are connected to the bases of succeeding transistors 9Q and 10Q, respectively, and the emitter of transistor 10Q is connected by a dropping resistor 124 to the common line 63. The signal applied to the input of the buffer 123 when the gate 113 opens is applied to a memory capacitor 126 connected from the base of transistor 8Q to the common line 63. The output of the peak I circuit 17 is taken between the emitter of the output transistor 10Q and the positive potential line 76. This output, as shown in FIG. 5d, is a step function, the magnitude of which is proportional to the magnitude of the peak amplitude of the current signal $I_c$ and therefore to the weld current. An increase in weld current amplitude increases the magnitude of the step function peak I in a negative direction.

The electrode voltage sensing circuit 12 (FIG. 6) energizing the peak E circuit 16 includes a voltage transformer 131 having a primary winding 132 which is connected through conductors 133 to the welding electrodes WE adjacent the weld position W. The welding electrode voltage is transformed to a magnitude suitable for energizing the peak E circuit 16 and appears across the center tapped secondary winding 134 of the transformer 131. The center tap 136 is connected to the input of a gate circuit 113a including transistors 29Q and 30Q. The gate 113a preferably is similar to the gate circuit 113 described above with respect to the peak I circuit 17 of FIG. 4 and thus requires no further description. The ends of the secondary winding 134 connect to the cathode ends of diodes 137 and the anode end of the diodes 137 connect to a junction point 138. A resistor 139 is connected across the center tap 136 and junction point 138 and carries the full wave rectified output (FIG. 7D) of the transformer 131.

The junction point 138 is connected to the common potential line 63. As in the peak I circuit of FIG. 4, a capacitor 126a is connected between the common line 63 and the output of gate circuit 113a. The output of the gate circuit 113a appears across the capacitor 126a, is fed through a buffer circuit 123a connected between the common line and the positive potential line 76 and comprising cascaded, follower transistors 19Q, 18Q and 17Q. The buffer circuit 123a is preferably similar to the buffer circuit 123 of FIG. 4, above described and hence requires no further description. However, the peak E circuit differs from the peak I circuit 16 of FIG. 4 in that the dropping resistor 139, to which the rectified signal from the input transformer is supplied, connects the gate input terminal to the common line 63 rather than to the positive potential line 76. The peak E circuit 16 further differs in that its output is taken across the emitter resistor 124a of the buffer 123a rather than between the emitter resistor and the positive potential line as in the peak I circuit. As in the peak I circuit of FIG. 4, the output of the peak E circuit is a step function (FIG. 7F), but one which swings positive as the magnitude of the electrode voltage $E_c$ increases, the magnitudes of the step function and electrode voltage being proportional.

The quotient circuit (FIG. 8) receives inputs by lines 24 and 23 from the peak I and peak E circuits 17 and 16, respectively. The peak I line 24 connects to the base of the transistor 7Q. Transistor 7Q is opposite in polarity to the other transistors in the circuit 26 and is therefore in the present embodiment a PNP transistor. The emitter of transistor 7Q connects through a dropping resistor 141 to the positive potential line 76 and the collector thereof connects through a capacitor 142 to a negative potential line 143, here maintained at negative 30 volts with respect to the common line 63.

The charge applied to the capacitor 142 by conduction through the transistor 7Q is directly applied to and controls the potential of the emitter of a unijunction transistor 11Q. The upper base of unijunction 11Q connects through a dropping resistance 146 to the common line 63 and its lower base connects through a drooping resistance 147 to the negative potential line 143.

A further unijunction transistor 14Q is connected as a free running oscillator, its bases being connected through resistors 148 and 149 to the common and negative potential line 63 and 143, respectively. The emitter of the unijunction transistor 14Q connects between a resistor 151 and capacitor 152 in turn serially connected between the common line 63 and the negative potential line 143. The capacitor 152 charges through its series resistor 151 to a level sufficient to fire the unijunction 14Q, which discharges the capacitor for another cycle. The RC constant of the series resistor 151 and capacitor 152 is chosen to give an oscillator frequency well above the weld current frequency, e.g., 10 KHZ. This high frequency output is taken from the lower base of transistor 14Q through a series resistance 153 and diode 154, the cathode of diode 154 being connected to the base 155 of a transistor 13Q.

The transistor 13Q and a further transistor 12Q form a flip-flop circuit 156. The emitters of transistors 12Q and 13Q connect directly to the negative potential line 143 and the collectors thereof connect through dropping resistors 157 and 158, respectively, to the common line 63. Additionally, the collector of transistor 12Q connects through a parallel capacitance 161 and resistance 162 to the base of transistor 13Q and the collector of transistor 13Q similarly connects through parallel capacitance 163 and resistance 164 to the base of transistor 12Q. In addition to the oscillator signal applied to the base 155, a further input is made to the flip-flop circuit 156 through a series resistance 166 and diode 167 for applying positive potentials to the base of transistor 12Q from the lower base of unijunction 11Q above described. Base bias is provided to the transistors 12Q and 13Q from the negative potential line 143 through resistances 168 and 169, respectively. The collector of flip-flop transistor 12Q also connects through an inductor 171 in series with a diode 172 to the upper end of capacitor 142 to maintain same discharged when transistor 12Q is conductive.

The output line 23 from the peak E circuit 16 of FIG. 6 connects through an isolating diode 176 to the collector of a transistor 16Q, whereby the collector potential of the transistor 16Q, when same is nonconductive, is directly proportional to the magnitude of the peak E step signal. The collector of transistor 16Q is biased through a dropping resistor 177 from the positive potential line 76, the emitter of said transistor being directly connected to the common potential line 63. The collector of transistor 13Q connects through a conductor 178 in series with parallel resistor capacitor network 181 and 182 to the base of transistor 16Q to vary the time of nonconduction of said transistor inversely proportional to the magnitude of the peak I signal. Base bias is provided the transistor 16Q from the positive potential line 76 through a resistor 183.

The collector potential of transistor 16Q is applied to the base of an emitter follower transistor 15Q through a line 184. The collector of transistor 15Q connects to its positive potential line 76 and its emitter connects through a dropping resistance 186 to the common line 63. Output is taken from the emitter of transistor 15Q across the resistor 186. This output is a square wave train indicated in FIG. 9 in which the amplitude E of each pulse is proportional to the welding electrode voltage magnitude while the duration 1/I is inversely proportional to the weld current magnitude. This square wave train is applied to the input of an integrating network 191, here comprising a first inductance 192 and capacitance 193 connected in series across the resistor 186 and second series inductance 194 and capacitance 196 connected across the first capacitor 193. The network 191 provides a d.c. voltage output $r$ proportional to the instantaneous contact resistance at the weld position. Output is taken from the network 191 across the second capacitance 196 and applied to the input of a high gain and polarity inverting operational amplifier 197 of any desired type. A resistance 198 is series with the capacitor 196 across the input of the amplifier 197 controls the amplitude of the input signal thereto. The operational amplifier 197 has the usual negative feedback resistance loop 199 from the output to the input therefor for regulating the gain thereof. The output R of the operational amplifier 197 appears on line 200 and is proportional to the instantaneous contact resistance across the welding position.

OPERATION

Although the operation of the present invention has been indicated to some extent hereinabove, the operation will hereinafter be summarized to assure a complete understanding of the invention.

THE PEAK PULSE CIRCUIT

The peak I pulse circuit 14 generates signal pulse $I_{pp}$ (FIG. 3F) which occur in each half cycle of weld current, at the peak of the weld current wave where the current is changing very slowly. It is at this point in the wave where the inductive signal coupled to the electrode voltage sensing wires is nearly zero.

A voltage signal $I_c$ (FIG. 3A) corresponding in waveform to the weld current is derived from current transformer 52 and applied through lines 61 both to the peak I circuit 17 and to transformer 58. Rheostat 59 connected across the secondary 57 adjusts the magnitude of the current signal so that it will fall within the working range of the control 10. The current signal I is transformed to the proper voltage level, full wave rectified, applied across load resistor 68 and capacitively coupled to the base of transistor 1Q. As long as the current signal $I_c$ is increasing, the coupling capacitor 69 will be charging and base current will flow in transistor 1Q causing this transistor to conduct. When the current signal $I_c$ reaches its peak level, charging of the capacitor 69 ceases and transistor 1Q ceases to conduct.

Transistors 1Q and 2Q are coupled together in a trigger circuit 70 so that the collector voltage (FIG. 3C) of transistor 2Q will be a reasonably sharp square waveform which goes positive at the beginning of weld current flow in each half cycle and goes negative at the peak of weld current.

Now at the beginning of weld current flow in each half cycle of the weld interval the current signal $I_c$ is rising rather slowly. Also, at this time, noise and transient signals are being produced in the system from a variety of causes. Some of this noise could conceivably be coupled into the trigger circuit 70 composed of transistors 1Q and 2Q to cause false triggering which would be most undesirable. For this reason, auxiliary signal circuit 73 is used to make sure that transistor 1Q conducts when weld current is intended to commence flowing in each half cycle of the weld interval.

A signal (FIG. 3D) that the ignitron tubes (not shown) are about to begin conduction in each half cycle of weld time is derived from the weld timer WT. This firing signal is here a positive voltage which goes negative as the weld current control system in the timer WT is triggered to turn on the weld current. The negative firing pulses are of sufficient duration (here several hundred microseconds) to insure that the usual "noise" generated in the welding system will have abated during the pulse duration. The firing pulse is applied to emitter follower transistor 5Q (for isolation purposes), and inverted in sign by simple amplifier transistor 6Q to create a positive going "swamping" pulse (FIG. 3E) which is applied to the base of transistor 1Q during the critical ignitron turn on time to "swamp" any noise which might reach the latter transistor. False triggering of transistor 1Q due to system noise generated by ignitron contactor turn-on is thereby prevented.

The collector voltage of transistor 2Q (FIG. 3C) is capacitively coupled to the "one-shot" multivibrator 80 comprising transistors 3Q and 4Q. The drop of this collector voltage causes transistor 3Q to cut off and transistor 4Q to conduct for a period of time determined by the circuit constants to apply a pulse $I_{pp}$ (FIG. 3F) of current to the primary of transformer 88. This pulse $I_{pp}$ is known as the "peak pulse" since it occurs at the magnitude peak of the weld current half cycle.

THE PEAK I CIRCUIT

The peak I circuit 17 (FIG. 4) generates a steplike signal proportional in magnitude to the peak magnitude of weld current. The gate 113 is actuated by the peak pulse $I_{pp}$ through transformer 88 to take a sample of the weld current signal $I_c$ at its peak point and store this value on capacitor 126 until the peak point of the next half cycle at which time another sample will be taken.

More particularly, a portion of the weld current signal $I_c$ from the current transformer 52 (FIG. 2) is transformed to the proper magnitude, full wave rectified, and applied across load resistor 68. Transistors 27Q and 28Q of gate 113 are normally cut off due to the absence of base drive but are turned on by the peak pulse signal $I_{pp}$ (FIG. 5C) from the secondary winding 118 of transformer 88. The voltage stored in the storage capacitor 126 is, therefore, equal to the peak value of the current signal in each half cycle. The stored voltage is buffered out by the triple emitter follower current amplifier 123 made up of transistors 8Q, 9Q and 10Q to provide current capability and appears on emitter line 24 as the peak I signal (FIG. 5D).

Note that the return path for the current signal rectifier circuit is to the positive line 76. The peak I signal therefore is measured as a negative going signal with respect to the positive line 76.

THE PEAK E CIRCUIT

The peak E circuit 16 (FIG. 6) develops a signal voltage (peak E) proportional to the voltage across the welding electrodes (FIG. 7A) at the current peak point and operates similarly to the peak I circuit 17 above described.

More particularly, conductors 133 connect the welding electrodes WE to the primary winding of transformer 131. The voltage signal $E_c$ (FIG. 7D) is transformed to the proper value, full wave rectified, and applied across load resistor 139. Normally nonconductive transistors 29Q and 30Q of series gate 113a are turned on by the peak pulse $I_{pp}$ from another secondary winding 118a of transformer 88 to charge the peak E storage capacitor 126a. The voltage stored on this capacitor is buffered out by transistors 17Q, 18Q, and 19Q and appears across resistor 124a as a step signal peak E (FIG. 7F), proportional to the peak electrode voltage. This signal is a positive going signal with respect to common line 63.

It will be noted that the voltage across the welding electrodes (FIG. 7A) is comprised of a series of at least approximately sinusoidal half waves of alternating polarity which is in phase with the welding current. However, due to inductive effects, the conductors 133 pick up an additional, spurious signal (FIG. 7B) proportional to the rate of change of welding current flow $di/dt$. The spurious signal has maximum points at the zero magnitude points of the welding current waveform where $di/dt$ is at a maximum and goes through zero at the weld current peaks where $di/dt$ is zero. Thus, the signal $E_c$ applied to the transformer 131 is a composite of the welding voltage and the spurious, induced voltage and as seen in FIG. 7C, the maxima and minima of the composite voltage signal $E_c$ are not in phase with the peaks of the actual electrode voltage and the welding current. To obtain a peak E value proportional to the peak value of the actual welding voltage of FIG. 7A, the maxima of the rectified composite signal $E_c$ (FIG. 7D) must be ignored. Instead, the rectified signal $E_c$ must be sampled at the weld current peaks where the inductive effect is not present, i.e., where $di/dt = 0$, and where also the weld voltage is at maximum magnitude. For this reason, the gate 113a is opened at the weld current peaks by the peak I pulses $I_{pp}$ whereby the potential impressed on capacitor 126a is proportional to the peak voltage at the welding electrodes WE and is unaffected by the spurious inductive signal.

THE QUOTIENT CIRCUIT

The quotient circuit 26 (FIG. 8) divides peak E by peak I and yields a signal proportional to weld resistance R.

Unijunction transistor 14Q, connected as a free running oscillator, generates positive pulses, at a frequency substantially higher than the welding current frequency, to turn on transistor 13Q. Transistors 13Q and 12Q are connected in a "-flip-flop" circuit. Conduction of transistor 13Q causes transistor 12Q to turn off so as to unclamp the capacitor 142 connected to the emitter of unijunction transistor 11Q and allow it to charge. Transistor 7Q, by virtue of emitter circuit feedback, acts as a current regulator to charge the above-mentioned capacitor at a rate determined by the magnitude of peak I. The charge time to any specific voltage will, therefore, be inversely proportional to the magnitude of peak I. Transistor 7Q charges the aforementioned capacitor to the peak point voltage of unijunction transistor 11Q at which point unijunction 11Q conducts to generate a positive going pulse at its base 1 electrode to cause transistor 12Q to turn on. The high characteristic stability with respect to time of the unijunction transistor assists close correlation of time during which capacitor 142 is charging and the magnitude of peak I. Conduction of transistor 12Q clamps the charging circuit of transistor 7Q so that no further charging will take place until oscillator 14Q generates another pulse at which time the process will repeat itself.

The time period of conduction of transistor 13Q is, therefore, inversely proportional to the magnitude of peak I. The frequency of oscillation of transistor 14Q is high with respect to frequency of variation of peak I signal and is here approximately 10 KC whereas the input signal normally varies at a rate of 120 cps maximum. The collector voltage of transistor 13Q is then in this embodiment a pulse train of frequency 10 KC wherein the width of the negative going portion of each pulse is modulated by the instantaneous value of the peak I signal so that this width is inversely proportional to the magnitude of the welding current.

The frequency of the oscillator 14Q is preferably substantially higher than the weld current frequency to allow the two frequencies to be readily separated with the relatively simple filter 191 so as to eliminate the oscillator frequency from the output of the quotient circuit. Further, a high oscillator frequency is desirable to achieve quotient circuit response soon after the weld current peak occurs and the weld current and electrode voltage are remeasured, in the present embodiment within 8 milliseconds or so of the weld current peak.

The collector voltage of transistor 13Q is applied as a signal to the base of transistor 16Q to cut same off when transistor 13Q conducts. During these nonconductive periods, the collector voltage of transistor 16Q will rise to the magnitude of peak E due to clamping by diode 176. This signal is buffered out by emitter follower transistor 15Q to yield a pulse train signal (FIG. 9) with amplitude proportional to weld peak voltage and width inversely proportional to weld current. The average (d.c.) value of this signal is, therefore, proportional to weld resistance and is known as r. This is a low level signal so it is amplified by a resistance feedback stabilized amplifier to yield weld resistance signal R. This resistance signal R is a positive going signal measured with respect to d.c. common line 63.

Proportioning the pulse duration inversely to the weld current amplitude rather than to the electrode voltage desirably renders the output signal R = 0 when weld current and electrode voltage are both zero and the expression R = E/I would otherwise be indeterminate.

The present quotient circuit avoids inaccuracies in prior circuits by using variables (time and signal amplitude) to which the quotient taking device 16Q responds independently and linearly. This arrangement eliminates possible inaccuracies in representing the inputs with similar variables (e.g., signal amplitudes) applied to different electrodes of a signal device wherein a change in one signal may undesirably modify the response of the device to the other signal, as by moving the operating point of the device into a nonlinear region.

The R generator circuitry 11 and the method of generating the R signal output hereinabove described are particularly intended and designed for use with the end weld control 36 and heat correction control 46 and as further discussed in the above-mentioned copending applications Ser. Nos. 650,789 and 650,964 respectively.

The present R generator circuitry 11 is of high stability and provides a d.c. output signal R which precisely tracks the contact resistance at the weld position during welding. The signal R as above discussed is not influenced by noise of other instabilities in the central portion of weld current flow, by inductive effects in the measurement of electrode voltage or by spurious interactions of the variables in the quotient taking process. Still further, the ratio R = E/I is "computed" a number of times in each half cycle at a rate determined by the oscillator 14Q, rather than just once, which desirably allows the quotient R to be computed quickly after each current peak (here within the first eight milliseconds or so). Thus, the R generator 11 is particularly adapted for determining instantaneous weld contact resistance for the succeeding end weld control and heat correction control due to its rapid reaction to changes in resistance and avoidance of sources of error likely to be encountered in measurements of weld contact resistance and which have undesirably influenced prior measuring circuits.

In summary, therefore, the R generator 11 generates the voltage signal $E_c$ and current signal $I_c$ in the circuits 12 and 13. The peak I pulse circuit 14 produces timing pulses $I_{pp}$ when energized by the current signal $I_c$ and applies such timing pulses to the peak E circuit 16 and peak I circuit 17 also energized, respectively, by the electrode voltage signal $E_c$ and current signal $I_c$. Thus, the peak E and peak I circuits 16 and 17 measure and store the instantaneous amplitude of the signals $E_c$ and $I_c$, respectively, when energized by the timing pulse $I_{pp}$ at the peak of the welding current waveform. The values so measured and stored, termed the peak E and peak I signals, are fed to the quotient circuit 26 which produces a d.c. output corresponding to the quotient $$r = \frac{\text{peak } E}{\text{peak } I}$$

which is thereafter amplified. The preferred quotient circuit 26 generates a high frequency pulse train, the pulse duration of which is constrained to proportionally with the inverse of the weld current magnitude and the amplitude of which is constrained to proportionality with the welding electrode voltage whereby the integrated value of each pulse is the desired resistance signal r proportional to the contact resistance.

Although a particular preferred embodiment of the invention has been described above for purposes of illustration, modifications and variations thereof lying within the scope of the present claims are fully contemplated.

The embodiments of the invention in which an exclusive property or privilege is claimed are defined as follows:

1. A quotient circuit for use in a controlled resistance welding circuit, comprising in combination:
   a capacitor and a current regulating transistor in series therewith for charging same, the input to said regulating transistor being proportional to the peak magnitude of the welding current whereby the rate of charging of said capacitor will be proportional to said welding current magnitude;
   an oscillator providing a periodic signal in excess of the welding current frequency;
   means responsive to said periodic signal for allowing said transistor to charge said capacitor;
   a unijunction transistor having its emitter connected to said capacitor and responsive to charging thereof to a preset potential for firing;
   switch means responsive to said signal for initiating a pulse and to conduction of said unijunction transistor for terminating said pulse;
   a quotient transistor and means maintaining a potential proportional to the welding electrode voltage across said quotient transistor when said quotient transistor is nonconductive and means further applying said pulse to the base of said transistor for rendering same nonconductive during the duration thereof whereby a pulse train appears across said quotient transistor with pulse amplitude proportional to the electrode voltage and a pulse duration inversely proportional to the welding current;
   means for integrating said pulse train with respect to time to provide a d.c. potential output proportional to the contact resistance at the welding position.

2. A quotient circuit for use in a controlled resistance welding circuit, comprising in combination:
   energy storage means and means responsive to the magnitude of a first signal for charging said storage means at a rate proportional to the magnitude of said first signal;
   a bistable switching device and means connecting same to said storage means for preventing storage of charge therein when said bistable switching device is in one switched state;
   oscillator means providing an alternating signal to one input of said switching device for causing same to assume the other of its two states whereby said storage means is allowed to charge;
   trigger means responsive to a preselected charge magnitude on said storage means for returning said switching device to said one state whereby to discharge said storage means, said switching device having an output terminal which when said device is in said other state carries a preselected signal of duration inversely proportional to the amplitude of said first input signal;
   shunting means controlled by the signal on the output of said switching device and connected to a second input point to which is applied a second signal, said shunting means shunting out said second signal at times other than when said signal appears on said output of said switching device whereby an alternating potential appears at said second input which is of amplitude proportional to said second signal and of duration inversely proportional to the amplitude of said first signal;
   means connected to said second input for averaging the alternating signal appearing thereat to provide a d.c. output of amplitude proportional to said second signal amplitude divided by said first signal amplitude.

3. A quotient circuit, comprising in combination:
   means for initiating a pulse;
   means chargeable at a rate proportional to a first input signal for rendering the duration of said pulse inversely proportional to said first input signal;
   means responsive to a second signal for rendering the amplitude of said pulse proportional to said second signal;
   whereby the product of the duration and amplitude of said pulse represents the quotient of said second signal divided by said first signal.

4. A circuit for finding the quotient of a second quantity divided by a first quantity, comprising in combination:
 means for providing a first signal of amplitude proportional to said first quantity and a second signal of amplitude proportional to said second quantity;
 means for producing a pulse train;
 means responsive to said pulse train for generating ramp signals from said first signal and including means responsive to said ramp signals for generating a further train of further pulses, the duration of each said further pulse conforming to the inverse of the instantaneous amplitude of said first signal;
 means responsive to said second signal for conforming the amplitude of each said pulse to the instantaneous amplitude of said second signal;
 means for determining the average amplitude of said pulse train, said average amplitude corresponding to said quotient.

5. A circuit according to claim 4, in which said pulse train producing means comprises an oscillator of frequency exceeding the expected frequency of changes in said first signal.

6. A circuit according to claim 4, in which said means responsive to said pulse train comprises storage means responsive to said first signal for changing an initial value stored therein at a rate corresponding to the amplitude of said first signal for generating said ramp signal, means responsive to initiation of a pulse by said pulse train producing means for enabling said changing and means responsive to a value change of preselected amount for returning said storage means to said initial value, and for terminating said further pulse.

7. A circuit according to claim 6, in which said means responsive to said second signal comprises a two input device having one input responsive to said second signal and the other input responsive to said further pulse for rendering the amplitude of said further pulse proportional to said amplitude of said second signal.

8. A circuit according to claim 4, in which said means for determining said average amplitude includes a filter.

9. A quotient circuit, comprising in combination:
 storage means;
 means for changing a condition of said storage means at a rate proportional to the magnitude of a first signal;
 means for generating periodic pulses and causing said change to commence in response to generation of one such pulse;
 first pulse control means responsive to occurrence of a preselected amount of change in the condition of said storage means for terminating said one pulse whereby the duration of said one pulse is inversely proportional to the magnitude of said first signal;
 second pulse control means for regulating the amplitude of said one pulse in proportion to the magnitude of a second signal;
 means for averaging said pulses over the time period of said pulse initiating means so as to provide a d.c. output proportional to the quotient of said second signal magnitude divided by said first signal magnitude.

10. A circuit according to claim 2, in which:
 said energy storage means comprises a capacitor;
 said means responsive to the magnitude of said first signal comprises a current regulator, the output of said current regulator being applied to said capacitor to charge same at a rate proportional to the voltage amplitude of said first signal;
 said bistable switching device comprises a flip-flop circuit including first and second valves, means connecting said first valve to said capacitor for clamping said capacitor at a minimum charge level when said first valve is conductive, means connecting said second valve to said oscillator for rendering said second valve conductive upon initiation of a pulse by said oscillator whereby said capacitor is unclamped by said first valve and allowed to charge;
 said trigger means comprises a unijunction transistor, means coupling the emitter thereof to said capacitor for firing said unijunction transistor when said capacitor is charged to a preselected level and means responsive to said firing of said unijunction transistor for rendering said first valve conductive and thereby clamping said capacitor;
 said shunting means includes a third valve having an input electrode, means connecting said input electrode to said second valve for rendering said third valve conductive when said second valve is nonconductive, means connecting said third valve across said second input for clamping said second input at a minimum voltage level and means for applying said second input signal to said averaging means when said third valve is nonconductive.

11. A circuit according to claim 10, in which said first and second signals are representative of weld current and electrode voltage in an alternating current welding circuit; and
 said oscillator means comprises a unijunction transistor connected as a free running oscillator and means setting the oscillator frequency at a level substantially higher than the weld current frequency.

* * * * *